United States Patent
Otsuka et al.

(10) Patent No.: US 10,882,504 B2
(45) Date of Patent: Jan. 5, 2021

(54) FILTER AND OIL CATCH APPARATUS

(71) Applicant: KNORR-BREMSE COMMERCIAL VEHICLE SYSTEMS JAPAN LTD., Sakado (JP)

(72) Inventors: Hiroki Otsuka, Sakado (JP); Hiroki Takahashi, Sakado (JP); Takeshi Yokoyama, Sakado (JP)

(73) Assignee: Bendix Commerical Vehicle Systems LLC, Elyria, OH (US)

( * ) Notice: Subject to any disclaimer, the term of this patent is extended or adjusted under 35 U.S.C. 154(b) by 876 days.

(21) Appl. No.: 15/524,695

(22) PCT Filed: Oct. 1, 2015

(86) PCT No.: PCT/JP2015/077961
§ 371 (c)(1),
(2) Date: Jul. 12, 2017

(87) PCT Pub. No.: WO2016/072184
PCT Pub. Date: May 12, 2016

(65) Prior Publication Data
US 2018/0304878 A1    Oct. 25, 2018

(30) Foreign Application Priority Data
Nov. 6, 2014   (JP) ................................ 2014-226103

(51) Int. Cl.
*B60T 17/00* (2006.01)
*B01D 39/08* (2006.01)
(Continued)

(52) U.S. Cl.
CPC ............ *B60T 17/004* (2013.01); *B01D 39/08* (2013.01); *B01D 39/083* (2013.01);
(Continued)

(58) Field of Classification Search
None
See application file for complete search history.

(56) References Cited

U.S. PATENT DOCUMENTS

| 945,632 A | * | 1/1910 | Strahl | ..................... B01D 45/02 55/410 |
| 3,450,632 A | | 6/1969 | Olsen et al. | |

(Continued)

FOREIGN PATENT DOCUMENTS

| CH | 505 639 A | 4/1971 |
| CN | 2238326 Y | 10/1996 |

(Continued)

OTHER PUBLICATIONS

Extended European Search Report issued in counterpart European Application No. 15856993.9 dated Apr. 5, 2018 with English translation (eight (8) pages).

(Continued)

*Primary Examiner* — Bobby Ramdhanie
*Assistant Examiner* — Brit E. Anbacht
(74) *Attorney, Agent, or Firm* — Crowell & Moring LLP

(57) ABSTRACT

A filter for an oil catch apparatus is provided. The oil catch apparatus is capable of efficiently extracting oil from air flowing through the oil catch apparatus while being of compact size. The filter includes a cylindrically wound main filter unit, a first keep member for keeping one end of the main filter unit, and a second keep member for keeping the other end of the main filter unit. Air flowing into the main filter unit from an opening formed in the first keep member is cleared of impurities upon passing through the main filter unit, and exits out of the main filter unit.

6 Claims, 9 Drawing Sheets

(51) Int. Cl.
    *F24F 7/00*       (2006.01)
    *F24F 13/02*     (2006.01)
    *B01D 46/24*     (2006.01)
    *B01D 39/20*     (2006.01)
    *B01D 39/16*     (2006.01)
    *B01D 46/00*     (2006.01)
    *B01D 53/26*     (2006.01)
    *B01D 46/42*     (2006.01)

(52) U.S. Cl.
    CPC ..... *B01D 39/1623* (2013.01); *B01D 39/2041* (2013.01); *B01D 46/0031* (2013.01); *B01D 46/24* (2013.01); *B01D 53/266* (2013.01); *B60T 17/002* (2013.01); *F24F 7/00* (2013.01); *F24F 13/02* (2013.01); *B01D 46/4236* (2013.01); *B01D 2239/0636* (2013.01); *B01D 2239/0695* (2013.01); *B01D 2258/0283* (2013.01); *B01D 2259/4566* (2013.01); *B01D 2275/105* (2013.01)

(56) References Cited

U.S. PATENT DOCUMENTS

| | | | | | |
|---|---|---|---|---|---|
| 3,696,932 | A | * | 10/1972 | Rosenberg | B01D 35/00 210/437 |
| 3,712,030 | A | * | 1/1973 | Priest | B01D 46/0087 96/118 |
| 3,738,089 | A | * | 6/1973 | Brill | F01N 3/00 55/310 |
| 3,769,780 | A | * | 11/1973 | Kasten | B60R 21/26 96/387 |
| 4,050,237 | A | | 9/1977 | Pall et al. | |
| 4,116,650 | A | * | 9/1978 | Lane | B01D 53/26 96/144 |
| 4,133,763 | A | * | 1/1979 | Cooper | B01D 35/153 210/232 |
| 4,231,768 | A | * | 11/1980 | Seibert | A61L 9/00 210/DIG. 5 |
| RE30,779 | E | * | 10/1981 | Cooper | B01D 35/147 210/232 |
| 4,316,801 | A | * | 2/1982 | Cooper | B01D 35/143 210/90 |
| 4,464,186 | A | * | 8/1984 | Mann | B01D 46/10 210/446 |
| 6,419,718 | B1 | | 7/2002 | Klug et al. | |
| 2002/0046555 | A1 | * | 4/2002 | Sherwood, Jr. | B01D 53/9431 55/482 |
| 2002/0150805 | A1 | | 10/2002 | Stenersen et al. | |
| 2002/0157359 | A1 | * | 10/2002 | Stenersen | B01D 53/0431 55/350.1 |
| 2004/0261621 | A1 | * | 12/2004 | Lindsay | B01D 46/521 96/388 |
| 2005/0126139 | A1 | * | 6/2005 | Sewell, Sr. | B01D 53/0431 55/512 |
| 2016/0001758 | A1 | | 1/2016 | Sugio | |
| 2017/0340997 | A1 | * | 11/2017 | Otsuka | B01D 39/12 |

FOREIGN PATENT DOCUMENTS

| | | |
|---|---|---|
| CN | 1646802 A | 7/2005 |
| ES | 2 302 758 T3 | 8/2008 |
| GB | 1 235 322 A | 6/1971 |
| JP | 50-21181 U | 3/1975 |
| JP | 6-34722 U | 5/1994 |
| JP | 6-63116 U | 9/1994 |
| JP | 9-290115 A | 11/1997 |
| JP | 2004-58002 A | 2/2004 |
| JP | 2007-130560 A | 5/2007 |
| JP | 2013-174224 A | 9/2013 |
| WO | WO 2010/129171 A2 | 11/2010 |
| WO | WO 2014/133035 A1 | 9/2014 |

OTHER PUBLICATIONS

International Search Report (PCT/ISA/210) issued in PCT Application No. PCT/JP2015/077961 dated Dec. 22, 2015 with English translation (five pages).
Japanese-language Written Opinion (PCT/ISA/237) issued in PCT Application No. PCT/JP2015/077961 dated Dec. 22, 2015 (four pages).
European Communication pursuant to Article 94(3) EPC issued in European Application No. 15856993.9 dated Mar. 16, 2020 (seven (7) pages).
Hindi-language Office Action issued in Indian Application No. 201737019530 dated Feb. 7, 2020 with English translation (seven (7) pages).
Chinese-language Office Action issued in counterpart Chinese Application No. 201580070059.0 dated Sep. 5, 2018 with English translation (13 pages).
Portuguese-language Office Action issued in counterpart Brazilian Application No. BR112017009307-3 dated Jan. 14, 2020 with partial English translation (six pages).

\* cited by examiner

FILTER AND OIL CATCH APPARATUS

CROSS REFERENCE TO RELATED APPLICATIONS

This application is a continuation of PCT International Application No. PCT/JP2015/077961, filed Oct. 1, 2015, which claims priority under 35 U.S.C. § 119 from Japanese Patent Application No. 2014-226103, filed Nov. 6, 2014, the entire disclosures of which are herein expressly incorporated by reference.

TECHNICAL FIELD

The present invention relates to a technical field relating to a filter and an oil catch apparatus disposed in piping for air passage and separating water, oil, impurities, and the like mixed in the air.

BACKGROUND ART

There are conventionally known vehicles that control a system, such as a braking system, using compressed air fed from a compressor. The compressed air may contain oil for lubricating the inside of the compressor. If the oil enters the system, malfunction may occur.

To cope with this, there is disclosed an oil catch apparatus that separates impurities temporarily collected by an oil catch part and exhausts only the air outside (see Patent Document 1).

CITATION LIST

Patent Document

Patent Document 1: JP 2013-174224A

DISCLOSURE OF THE INVENTION

Problems to be Solved by the Invention

The oil catch apparatus described in Patent Document 1 has a structure that separates the oil and recovers the same by making air containing the oil collide with a collision plate. Thus, it is necessary to ensure a distance for making the air collide with the collision plate, resulting in an increase in the apparatus size.

The present invention has been made in view of the above situation, and an object thereof is to provide an oil catch apparatus capable of extracting a sufficient amount of oil albeit being of compact size.

Means for Solving the Problems

To solve the above problem, a filter according to an embodiment of the present invention includes: a cylindrically formed main filter unit; a first keep member for keeping one end of the main filter unit; and a second keep member for keeping the other end of the main filter unit. Air flowing into the main filter unit from an opening formed in the first keep member is cleared of impurities upon passing through the main filter unit, and exits from a peripheral surface of the main filter unit.

Further, in the filter according to the embodiment of the present invention, the main filter unit includes an element formed of a metallic network sheet and a resinous mesh sheet.

Further, in the filter according to the embodiment of the present invention, the element is formed by winding a stack of a stainless network sheet and a resinous mesh sheet cylindrically.

Further, in the filter according to the embodiment of the present invention, the main filter unit includes: an outer cylindrical member comprising a sheet-form stainless material having an opening formed therein, and an inner cylindrical member located inside of the outer cylindrical member with the element held between them and comprising a sheet-form stainless material having an opening formed therein.

Further, the filter according to the embodiment of the present invention further includes an inlet member inserted into the opening formed in the first keep member.

Further, the filter according to the embodiment of the present invention further includes a muffler inside of the main filter unit.

Further, in the filter according to the embodiment of the present invention, the muffler includes a muffler member that is located on the first keep member side inside of the main filter unit and vertically with respect to an axial direction.

Further, in the filter according to the embodiment of the present invention, the muffler member includes a surface member and a back-surface member, each formed of a mesh sheet, and a coupler member that makes a coupling between the surface member and the back-surface member.

Further, to solve the above problem, an oil catch apparatus according to an embodiment of the present invention includes: a main unit; a lid that covers up an opening in the main unit; a filter that is located inside of the main unit; and a buffer that supports the filter.

Advantages of the Invention

To solve the above problem, a filter according to an embodiment of the present invention includes: a cylindrically formed main filter unit; a first keep member for keeping one end of the main filter unit; and a second keep member for keeping the other end of the main filter unit. Air flowing into the main filter unit from an opening formed in the first keep member is cleared of impurities upon passing through the main filter unit, and exits from a peripheral surface of the main filter unit. Thus, the filter can extract a sufficient amount of oil albeit being of compact size.

Further, in the filter according to the embodiment of the present invention, the main filter unit includes an element formed of a metallic network sheet and a resinous mesh sheet, thereby allowing the oil and the like to be separated and collected efficiently within a limited space.

Further, in the filter according to the embodiment of the present invention, the element is formed by winding a stack of a stainless network sheet and a resinous mesh sheet cylindrically, thereby allowing the filter 1 to be manufactured at low cost.

Further, in the filter according to the embodiment of the present invention, the main filter unit includes: an outer cylindrical member comprising a sheet-form stainless material having an opening formed therein, and an inner cylindrical member located inside of the outer cylindrical member with the element held between them and comprising a sheet-form stainless material having an opening formed therein. Thus, it is possible to suppress the oil and the like separated from the air from splashing with a simple structure.

Further, the filter according to the embodiment of the present invention further includes an inlet member inserted into the opening formed in the first keep member can thus be attached to an air flow path with ease.

Further, the filter according to the embodiment of the present invention further includes a muffler inside of the main filter unit, thereby allowing muffling effect to be enhanced.

Further, in the filter according to the embodiment of the present invention, the muffler includes a muffler member that is located on the first keep member side inside of the main filter unit and vertically with respect to an axial direction. Thus, it is possible to enhance muffling effect with a simple structure.

Further, in the filter according to the embodiment of the present invention, the muffler member includes a surface member and a back-surface member, each formed of a mesh sheet, and a coupler member that makes a coupling between the surface member and the back-surface member. Thus, it is possible to further enhance muffling effect with a simple structure.

Further, to solve the above problem, an oil catch apparatus according to an embodiment of the present invention includes: a main unit; a lid that covers up an opening in the main unit; a filter that is located inside of the main unit; and a buffer that supports the filter. Thus, the oil catch apparatus 100 can extract a sufficient amount of oil albeit being of compact size.

BEST MODE FOR CARRYING OUT THE INVENTION

An embodiment of the present invention will be described below with reference to the drawings.

Figure 1:
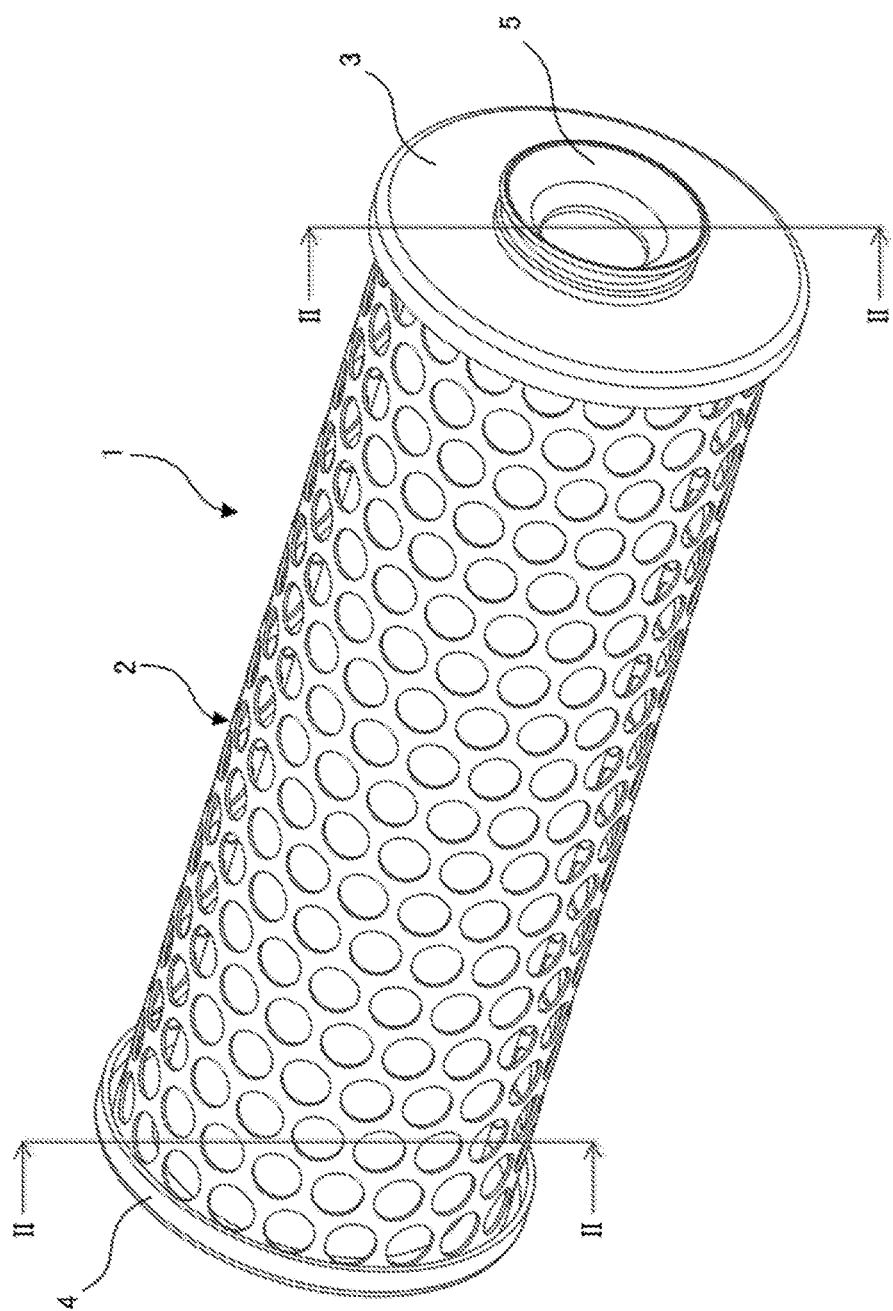
FIG. 1 is a perspective view of an oil filter according to an embodiment of the present invention.
Figure 2:
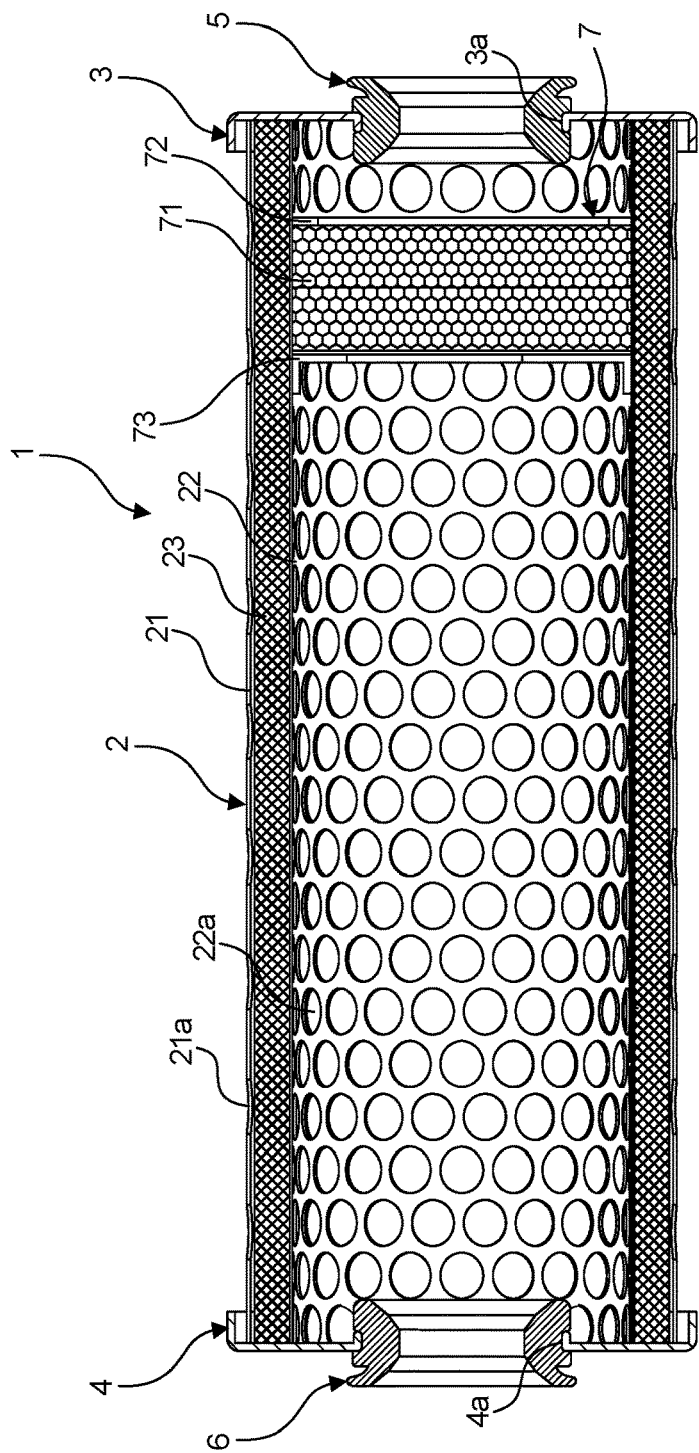
FIG. 2 is a cross-sectional view as viewed in the direction of the arrow II-II of FIG. 1.

FIG. 1 is a perspective view of an oil filter according to an embodiment of the present invention. FIG. 2 is a cross-sectional view as viewed in the direction of the arrow II-II of FIG. 1.

A filter 1 includes a main filter unit 2, a first keep member 3, a second keep member 4, an inlet member 5, a mounting member 6, and a muffler 7. One end of the main filter unit 2 is held by the first keep member 3, and the other end thereof is held by the second keep member 4. The inlet member 5 is attached to the first keep member 3, and the mounting member 6 is attached to the second keep member 4. The muffler 7 is attached to the inner periphery of the main filter unit 2 at the side of the inlet member 5.

The main filter unit 2 has an outer cylindrical member 21, an inner cylindrical member 22, and an element 23. The outer cylindrical member 21 is formed by winding, in a tubular shape, sheet-form stainless having openings 21a formed therein. The inner cylindrical member 22 is formed by winding sheet-form stainless having openings 22a in a tubular shape and is located inside the outer cylindrical member 21. The element 23 is formed by winding a stack of a predetermined number of stainless network sheets and a predetermined number of resinous mesh sheets cylindrically and incorporated between the outer cylindrical member 21 and inner cylindrical member 22. The above material and structure of the element 23 are illustrative and may be arbitrarily selected considering separation efficiency or resistance.

The first keep member 3 and second keep member 4 keep the both ends of the cylindrically-formed main filter unit 2, respectively to thereby keep the winding state of the main filter unit 2. A first insertion opening 3a is formed at the center of the first keep member 3, and the inlet member 5 is inserted thereinto. A second insertion opening 4a is formed at the center of the second keep member 4, and the mounting member 6 is inserted thereinto. A not illustrated flow path for inflow of air containing impurities such as oil is inserted into the inlet member 5. A filter support member to be described later is inserted into the mounting member 6. A configuration may be possible in which second insertion opening 4a and mounting member 6 are not provided, but the second keep member 4 is directly supported by another member.

The first and second keep members 3 and 4 may be made of the same material, and the inlet member 5 and mounting member 6 may be made of the same material, whereby manufacturing cost can be reduced.

The muffler 7 has a muffler member 71, a first support member 72, and a second support member 73. The first and second support members 72 and 73 are attached to the inner periphery of the main filter unit 2 at the side of the inlet member 5 with a predetermined interval therebetween. The muffler member 71 is incorporated between the first and second support members 72 and 73.

Figure 3A:
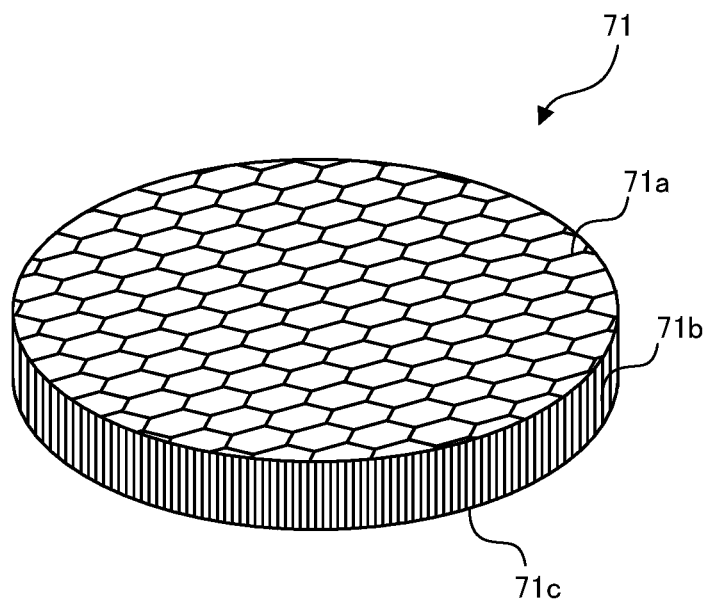
FIGS. 3A and 3B are perspective views each illustrating an example of a muffler member according the present embodiment.
Figure 3B:
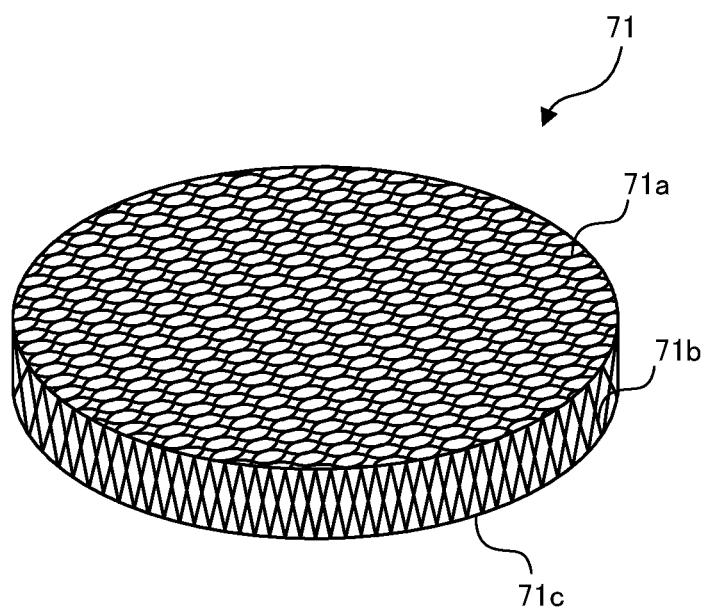
Figure 4A:
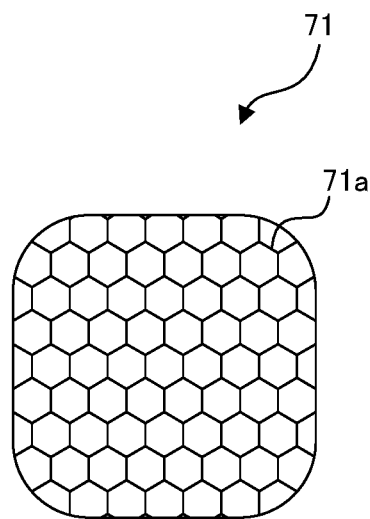
FIGS. 4A and 4B each illustrate an example of a mesh structure of a surface member or a back-surface member.
Figure 4B:
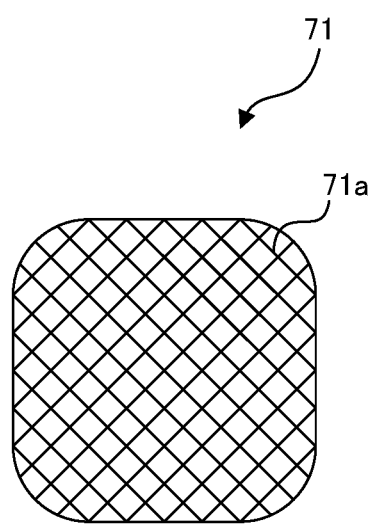
Figure 5A:
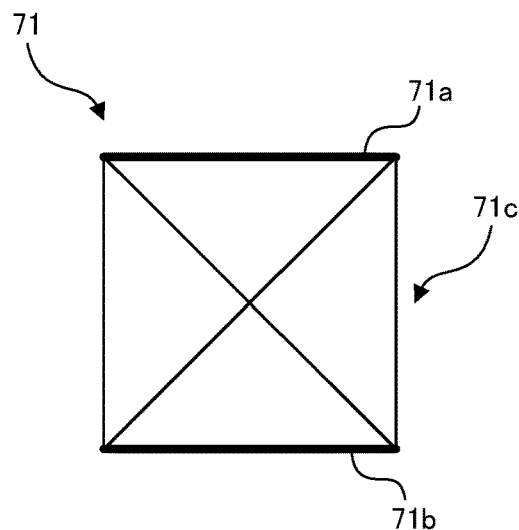
FIGS. 5A to 5C each illustrate an example of a coupling structure of a coupler member.
Figure 5B:
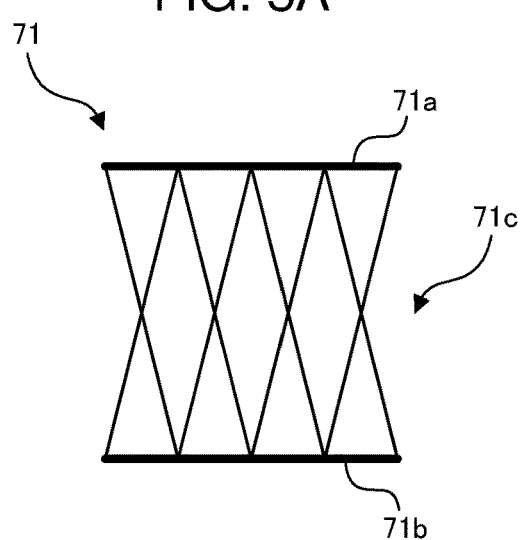
Figure 5C:
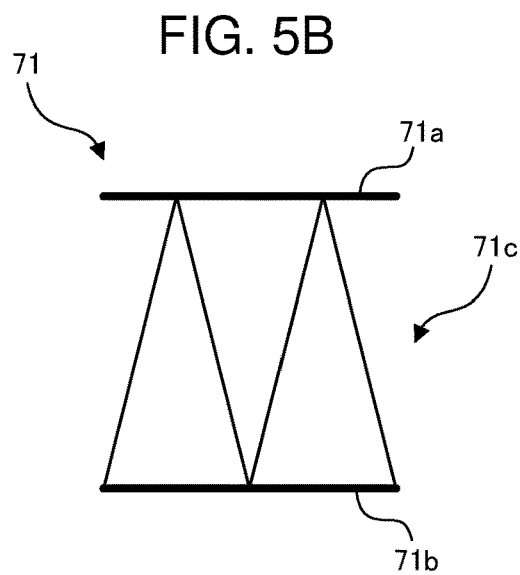
Figure 6A:
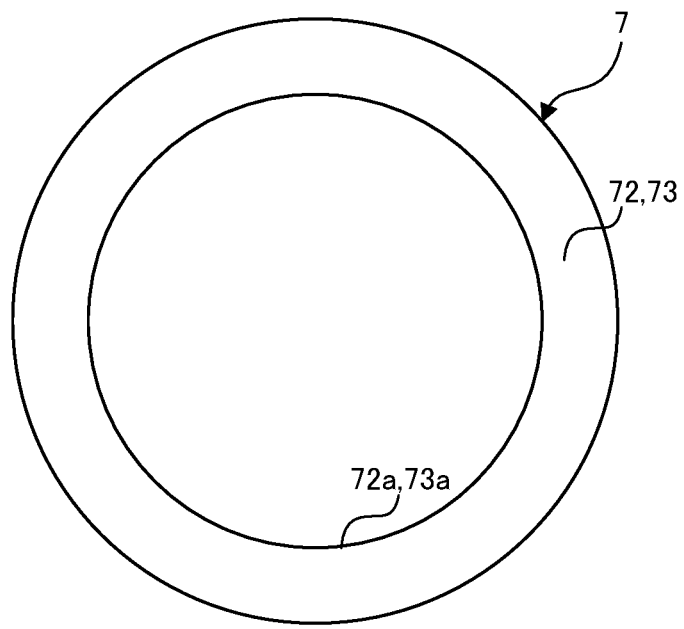
FIGS. 6A and 6B each illustrate an example of the first support member or second support member.
Figure 6B:
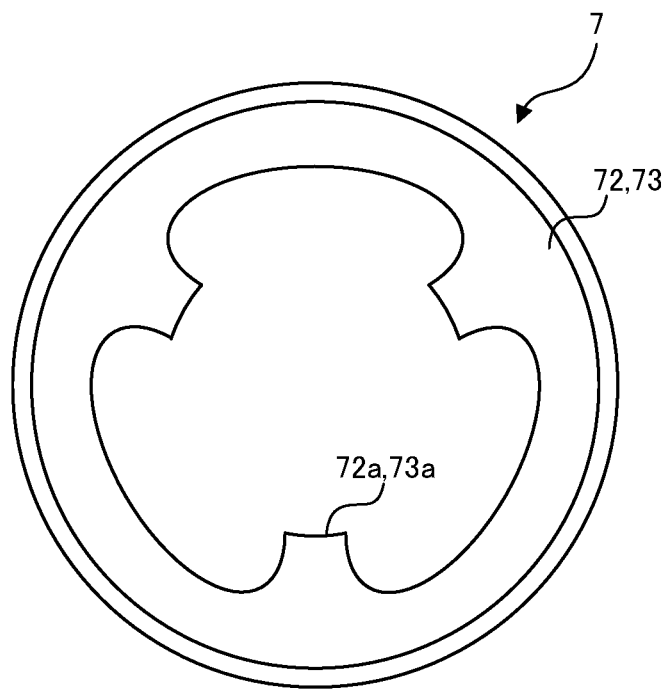

FIGS. 3A and 3B are perspective views each illustrating an example of the muffler member according the present embodiment. FIGS. 4A and 4B each illustrate an example of a mesh structure of a surface member or a back-surface member. FIGS. 5A to 5C each illustrate an example of a coupling structure of a coupler member. FIGS. 6A and 6B each illustrate an example of the first support member or second support member.

The muffler member 71 has a surface member 71a, a back-surface member 71b, and a coupler member 71c.

The surface member 71a and back-surface member 71b are each a sheet formed in a mesh by use of polyethylene terephthalate, synthetic resin, or chemical fiber. The surface member 71a and back-surface member 71b are formed into a circular shape having substantially the same diameter as the inner periphery of the inner cylindrical member 22. The mesh structure of each of the surface member 71a and back-surface member 71b may not only be the mesh patterns illustrated in FIGS. 3A and 3B, but also the hexagonal pattern as illustrated in FIG. 4A or the plain weave pattern as illustrated in FIG. 4B. Using the thus configured surface member 71a and back-surface member 71b allows extensibility and surface rigidity to be improved.

The coupler member 71c is formed in a fiber shape by use of polyethylene terephthalate, synthetic resin, or chemical fiber and makes a coupling between the surface member 71*a* and back-surface member 71*b*. The coupler member 71*c* may have not only the coupling structures illustrated in FIGS. 3A and 3B, but also the bracing structure as illustrated in FIG. 5A, the cross structure as illustrated in FIG. 5B, or the truss structure as illustrated in FIG. 5C. Using the thus configured coupler member 71*c* allows strength at compression to be improved.

The first and second support members 72 and 73 support the muffler member 71 by sandwiching the same from both sides. The first and second support members 72 and 73 are each formed into a circular shape having substantially the same diameter as the inner periphery of the inner cylindrical member 22 and attached to the inner periphery of the inner cylindrical member 22. The first and second support members 72 and 73 have openings 72*a* and 73*a*, respectively, at a position including at least the center thereof. The shapes of the openings 72*a* and 73*a* may each be the circular shape as illustrated in FIG. 6A. Alternatively, as illustrated in FIG. 6B, the first and second support members 72 and 73 may each have a support part for supporting the muffler member 71 inside the circular shape.

Next, the air flow in the thus configured filter 1 will be described.

Air containing impurities such as oil flows into the filter from the inlet member 5. Subsequently, the air flows into the muffler 7. In the muffler 7, the air passes through the opening 72*a* of the first support member 72 and flows into the muffler member 71. In the muffler member 71, the air sequentially passes through the surface member 71*a*, coupler member 71*c*, and back-surface member 71*b* in this order. Thereafter, the air passes through the opening 73*a* of the second support member 73 and flows out of the muffler 7. Then, the air flows into the main filter unit 2. In the main filter unit 2, the air passes through the openings 22*a* of the inner cylindrical member 22, element 23, and openings 21*a* of the outer cylindrical member 21. The impurities such as oil contained in the air are collected mainly by the element 23 and fall to the lower portion of the filter 1 through the element 23.

Using the thus configured filter 1 allows the oil and the like to be separated and collected efficiently within a limited space. Further, using the stainless material allows the filter 1 to be manufactured at lower cost than with a conventional filter made of brass. Further, using the mesh structure element 23 can enhance muffling effect. In addition, incorporating the muffler 7 can further enhance muffling effect. Furthermore, the axis of the main filter unit 2 of the filter 1 can be set in the horizontal direction, so that effective utilization of space and space-saving arrangement can be achieved.

Next, an oil catch apparatus 100 using the thus configured filter 1 will be described.

Figure 7:
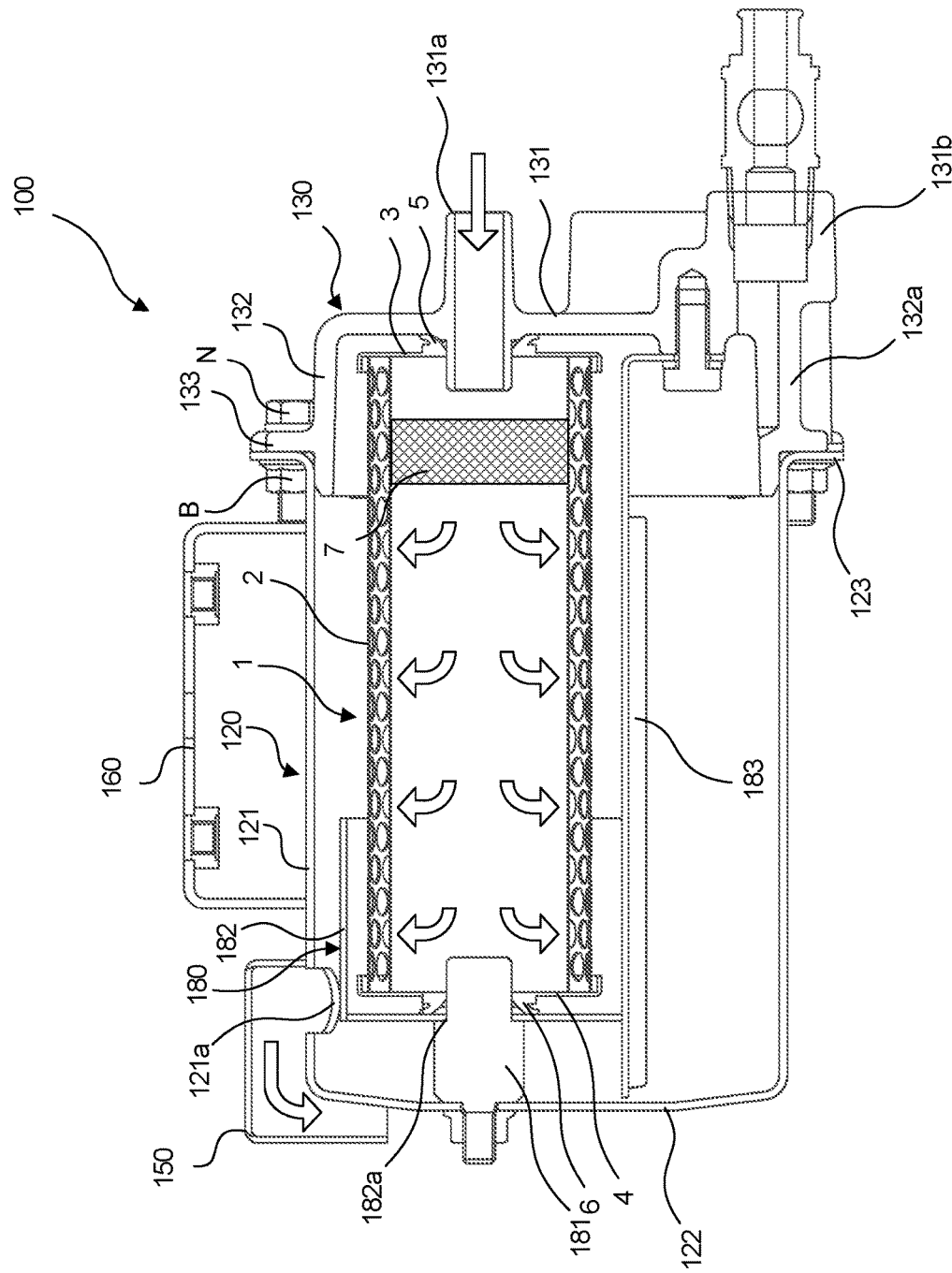
FIG. 7 is a cross-sectional view of an oil catch apparatus 100 according to the present embodiment.
Figure 8:
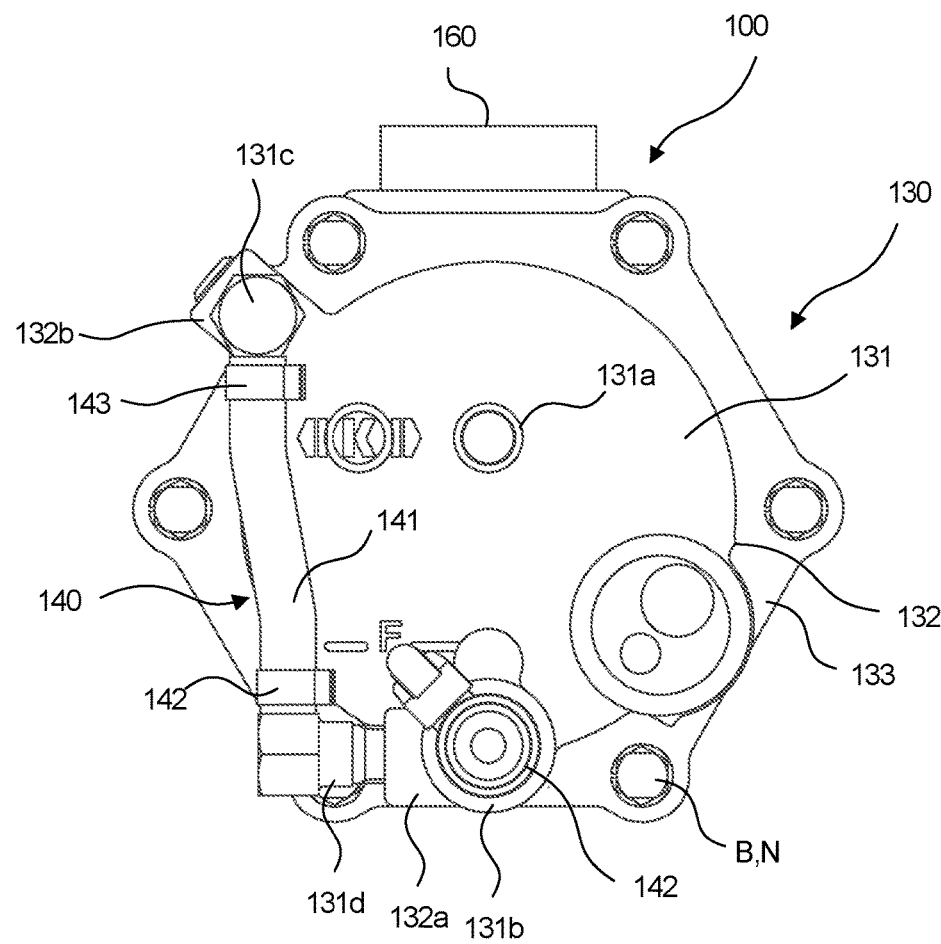
FIG. 8 is a side view of the oil catch apparatus 100 according to the present embodiment.

FIG. 7 is a cross-sectional view of the oil catch apparatus 100 according to the present embodiment. FIG. 8 is a side view of the oil catch apparatus 100 according to the present embodiment.

The oil catch apparatus 100 according to the present embodiment includes a main unit 120, a lid 130 that covers the opening of the main unit 120, a hose 140 attached to the lid 130, an exhaust guide 150 that guides flow of exhaust air, and a mounting part 160 installed in the main unit 120.

The main unit 120 has a cylinder 121, a bottom part 122, and a main unit flange 123. The cylinder 121 according to the present embodiment is disposed such that the axis thereof is set in the horizontal direction. Although the cylinder 121 is formed into a cylindrical shape, it may have a rectangular cylindrical shape or an elliptic cylindrical shape. The bottom part 122 is formed so as to close one opening of the cylinder 121. An exhaust opening 121*a* is formed on the bottom part 122 side of the cylinder 121. The main unit flange 123 protrudes outward from the cylinder 121 at a side opposite to the bottom part 122 in a direction perpendicular to the longitudinal direction of the main unit 120. Although the cylinder 121, bottom part 122, and flange part 123 may be formed separately and joined together by welding or the like, they are preferably formed integrally.

The lid 130 has a flat part 131, a side part 132, and a lid flange 133. The shape of the flat part 131 is preferably the same as that of the bottom part 122 of the main unit 120. An inlet 131*a* protrudes from the flat surface of the flat part 131 and has therein a hole penetrating therethrough in the same direction as the protruding direction thereof. The inlet 131*a* preferably protrudes in a direction perpendicular to the flat surface. The side part 132 extends in the vertical direction from the outer periphery of the flat part 131. The side part 132 has first and second protruding parts 132*a* and 132*b* protruding the side thereof. A drain outlet 131*b* protrudes from the flat surface of the side part 132 and has therein a hole penetrating therethrough in the same direction as the protruding direction thereof. A stop 131*c* protrudes from the flat surface of the second protruding part 132*b*. The first and second protruding parts 132*a* and 132*b* preferably protrude in a direction perpendicular to the side surface. The lid flange 133 protrudes outward from the side part 132 at a side opposite to the flat part 131 in a direction perpendicular to the longitudinal direction of the main unit 120. Although the flat part 131, side part 132, and lid flange 133 may be formed separately and joined together by welding or the like, they are preferably formed integrally.

Coupling holes 123*a* and 133*a* through each of which a bolt B for coupling the main unit 120 and lid 130 penetrates are formed in the main unit flange 123 and lid flange 133, respectively. The bolt B penetrating through each of the coupling holes 123*a* and 133*a* is fastened by a nut N. Although the bolt B and nut N are used as a coupling part for coupling the main unit 120 and lid 130 in the present embodiment, another structure may be used.

The hose 140 has a tubular member 141 made of a transparent or translucent soft material. One side of the tubular member 141 is coupled by a first clip 142 or the like to an amount detecting port 131*d* separated from the drain outlet 131*b* in the first protruding part 132*a* of the lid 130. The other side of the tubular member 141 is normally attached to the stop 131*c* of the lid 130 by a second clip 143 or the like.

By installing the hose 140 in this manner, it is possible to confirm the amount of oil or the like accumulated in the transparent or translucent tubular member 41.

The exhaust guide 150 is installed to the cylinder 121 so as to cover the exhaust opening 121*a* formed in the upper portion of the cylinder 121 of the main unit 120 with its eaves. The exhaust guide 150 guides exhaust gas exhausted from the exhaust opening 121*a*.

By installing the exhaust guide 150 in this manner, it is possible to guide exhaust gas properly.

The mounting part 160 is installed to the cylinder 121 of the main unit 120. The main unit 120 is mounted to a not illustrated vehicle body through the mounting part 160.

A buffer 180 has a filter support member 181, a buffer member 182, and a buffer mounting member 183. The filter support member 181 supports the second keep member 4 through the mounting member 6 and mounted to the main unit 120 together with the buffer member 182 and buffer mounting member 183. The buffer member 182 is formed into a tubular shape so as to cover a portion of the filter 1 on the side opposite to the inlet 131a. A third insertion opening 182a into which the filter support member 181 is inserted is formed at the center of the buffer member 182. The buffer mounting member 183 is supported by the filter support member 181 at one end thereof and supported by the lid 130 at the other end thereof.

By installing the buffer 180, it is possible to suppress the oil and the like separated from air from splashing.

Next, the air flow and oil collection will be described.

Air flowing in the oil catch apparatus 100 from the inlet 131a flows inside the filter 1 is cleared of the oil and the like upon passing through the filter 1. The air on the outer peripheral side of the filter 1 is in a purified state where the oil and the like have been separated. The purified air is exhausted from the exhaust opening 121a. The oil and the like separated in the filter 1 fall downward to be accumulated temporarily in the cylinder 121 of the main unit 120. Thereafter, the oil and the like are discharged from the drain outlet 131b.

Figure 9:
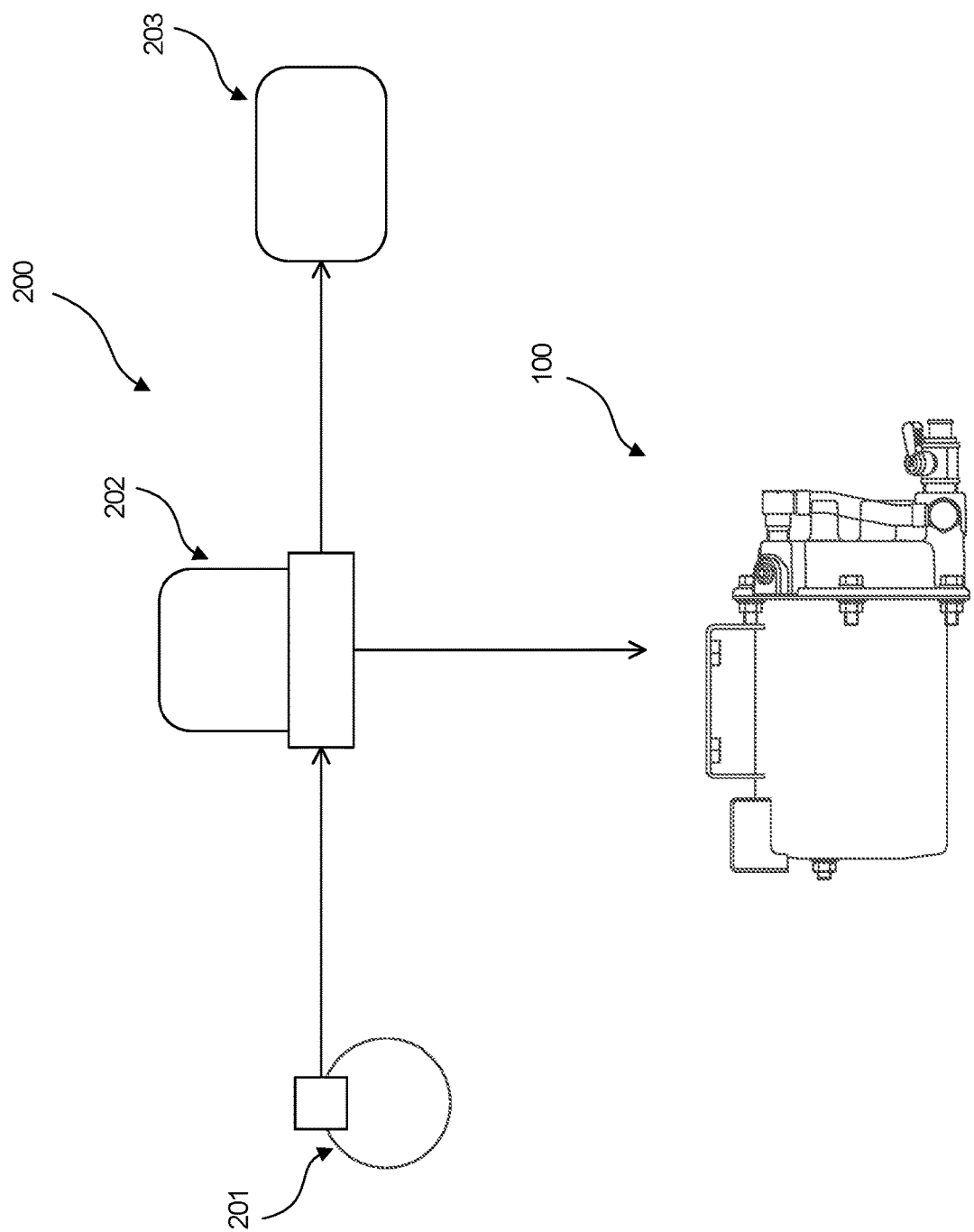
FIG. 9 illustrates an air treatment system 200 using the oil catch apparatus 100 according to the present embodiment.

FIG. 9 illustrates an air treatment system 200 using the oil catch apparatus 100 according to the present embodiment.

The air treatment system 200 according to the present embodiment controls a braking system or the like using compressed air fed from a compressor 201. The compressed air exhausted from the compressor 201 is fed to an air dryer 202. The air dryer 202 removes the oil and the like contained in the compressed air and feeds the resultant dry air to an air tank 203.

Direct disposal of the oil and the like removed by the air dryer 202 can greatly affect environment, so that the oil and the like are separated and collected by the oil catch apparatus 100 according to the present embodiment.

As described above, the filter 1 according to the present embodiment includes the cylindrically-formed main filter unit 2, first keep member 3 that keeps the both ends of the main filter unit 2, and second keep member 4 that keeps the other end of the main filter unit 2. Air flowing inside the main filter unit 2 through the opening 3a formed in the first keep member 3 is cleared of the oil and the like upon passing through the main filter unit 2 and exits from the outer peripheral side of the main filter unit 2. Thus, the filter 1 can extract a sufficient amount of oil albeit being of compact size.

Further, in the filter 1 according to the present embodiment, the main filter unit 2 has the element 23 formed by use of metallic network sheets and resinous mesh sheets, thereby allowing the oil and the like to be separated and collected efficiently within a limited space.

Further, in the filter 1 according to the present embodiment, the element 23 is formed by winding a stack of stainless network sheets and resinous mesh sheets cylindrically, thereby allowing the filter 1 to be manufactured at low cost.

Further, in the filter 1 according to the present embodiment, the main filter unit 2 has the outer cylindrical member 21 made of sheet-form stainless having openings formed therein, inner cylindrical member 22 made of sheet-form stainless having openings formed therein and located inside the outer cylindrical member 21 with the element 23 interposed therebetween. Thus, it is possible to suppress the oil and the like separated from the air from splashing with a simple structure.

Further, the filter 1 according to the present embodiment has the inlet member 5 inserted into the opening 3a formed in the first keep member 3 and can thus be attached to an air flow path with ease.

Further, the filter 1 according to the present embodiment has the muffler 7 inside the main filter unit 2, thereby allowing muffling effect to be enhanced.

Further, in the filter 1 according to the present embodiment, the muffler 7 has the muffler member 71 located on the first keep member 3 side inside of the main filter unit 2 and vertically with respect to the axial direction of the filter 1. Thus, it is possible to enhance muffling effect with a simple structure.

Further, in the filter 1 according to the present embodiment, the muffler member 71 has the surface member 71a and back-surface member 71b which are each made of a mesh sheet and coupler member 71c that makes a coupling between the surface member 71a and back-surface member 71b. Thus, it is possible to further enhance muffling effect with a simple structure.

Further, the oil catch apparatus 100 according to the present embodiment includes the main unit 120, lid 130 that covers the opening of the main unit 120, filter 1 located inside the main unit 120, and buffer 180 that supports the filter 1. Thus, the oil catch apparatus 100 can extract a sufficient amount of oil albeit being of compact size.

While the various embodiments of the present invention have been described, the present invention is not limited to these embodiments, and various modifications are possible within the scope of the invention. For example, a configuration obtained by appropriately modifying each embodiment and a configuration appropriately combining configurations of the different embodiments are also included in the technical scope of the present invention.

REFERENCE SIGNS LIST

1: Filter
2: Main filter unit
3: First keep member
4: Second keep member
5: Inlet member
6: Mounting member
7: Muffler
100: Oil catch apparatus
120: Main unit
121: Cylinder
122: Bottom part
123: Main unit flange
130: Lid
131: Flat part
132: Side part
133: Lid flange
140: Hose
141: Tubular member
142: First clip
143: Second clip
150: Exhaust guide
160: Mounting part
180: Buffer
181: Filter support member
182: Buffer member
183: Buffer mounting member

What we claim is:
1. A filter, comprising:
a cylindrically formed main filter unit,
a first keep member configured to keep one end of the main filter unit,
a second keep member configured to keep the other end of the main filter unit; and
a muffler, wherein
- the muffler is located in the main filter unit and includes a muffler member located on the first keep member side inside of the main filter unit,
- the muffler member includes a surface member and a back-surface member, each formed of a mesh sheet, and a coupler member configured to couple the surface member and the back-surface member,
- the surface member and the back-surface member are arranged apart from one another in the axial direction such that air entering from an opening formed in the first keep member passes in the axial direction through the surface member, the coupling member and the back-surface member into an inner region of the main filter unit prior to passing radially outward through a cylindrical side of the main filter unit, and
- the air entering from the opening formed in the first keep member is cleared of impurities upon passing through the main filter unit and exits from a peripheral surface of the main filter unit.

2. The filter according to claim 1, wherein the main filter unit includes an element formed of a metallic network sheet and a resinous mesh sheet.

3. The filter according to claim 2, wherein the element is formed by winding a stack of a stainless network sheet and a resinous mesh sheet cylindrically.

4. The filter according to claim 3, wherein the main filter unit includes
- an outer cylindrical member comprising a sheet-form stainless material having an opening formed therein,
- an inner cylindrical member located inside of the outer cylindrical member comprising a sheet-form stainless material having an opening formed therein, and
- the element is located between the outer cylindrical member and the inner cylindrical member.

5. The filter according to claim 4, further comprising:
an inlet member located in the opening formed in the first keep member.

6. An oil catch apparatus, comprising:
a main unit,
a lid configured to cover an opening in the main unit,
a filter according to claim 1 located inside of the main unit, and
a buffer configured to support the filter.

* * * * *